United States Patent [19]

Raskin et al.

[11] Patent Number: 4,716,556
[45] Date of Patent: Dec. 29, 1987

[54] MAGNETOSTRICTIVE ACOUSTIC TRANSDUCER

[75] Inventors: Donald Raskin, New York; James E. Kearney, New Hyde Park, both of N.Y.; Errol A. Haznedar, Ridgewood, N.J.

[73] Assignee: Allied-Signal Inc., Morris Township, Morris County, N.J.

[21] Appl. No.: 286,214

[22] Filed: Jul. 23, 1981

[51] Int. Cl.$^4$ .............................................. G01V 1/38
[52] U.S. Cl. ................................... 367/168; 367/156; 367/169; 310/26
[58] Field of Search ...................... 367/156, 168-171, 367/186; 181/110; 73/649, DIG. 2; 310/26; 75/123 K, 123 D

[56] References Cited

U.S. PATENT DOCUMENTS

| | | | |
|---|---|---|---|
| 3,346,841 | 10/1967 | Weichart | 367/168 |
| 3,375,490 | 3/1968 | Stubblefield | 367/156 |
| 3,509,523 | 4/1970 | Parker et al. | 367/168 |
| 3,881,165 | 4/1975 | Parker et al. | 367/169 |
| 4,129,851 | 12/1978 | Podgorski | 310/26 |
| 4,221,592 | 9/1980 | Ray | 75/123 K |
| 4,234,360 | 11/1980 | Fuschmann et al. | 75/123 K |
| 4,245,329 | 1/1981 | Dubois | 367/170 |
| 4,264,882 | 4/1981 | Tsuya | 333/141 |
| 4,296,486 | 10/1981 | Vasile | 310/26 |
| 4,361,879 | 11/1982 | Dubbleday et al. | 310/26 |
| 4,364,013 | 12/1982 | Castera et al. | 324/207 |
| 4,385,932 | 5/1983 | Inomata et al. | 75/123 K |

FOREIGN PATENT DOCUMENTS 5411019  1/1979  Japan ................................. 75/123 K

OTHER PUBLICATIONS

Mohri et al., "Stress-Magnetic Effects...", 5/15/81, pp. 3379-3381, IEEE Trans. Magn, vol. Mag-17, #6, Conference Report. Abst. only.
Mohri et al., "Force and Displacement...," 2/79, pp. 105-112, Electr. Eng. Japan, vol. 99, #1, Abst. only.
Lynnworth et al., "Magnetostriction Transducers for .. . Vibration ...", 3/71, pp. 33-35, Mater. Res. & Stand. (USA), vol. #11, No. 3.
Knott, "Uniformally Sensitive Line Hydrophones", 7/75, pp. 1-14, NTIS AD-A015 649.

*Primary Examiner*—Nelson Moskowitz
*Attorney, Agent, or Firm*—Gus T. Hampilos; Ernest D. Buff; Gerhard H. Fuchs

[57] ABSTRACT

An acoustic transducer is provided that uses a layer of magnetostrictive ferromagnetic material having high magneto-mechanical coupling. The ferromagnetic material is adhered to a part of the outer surface of a resilient rod, so that an incident acoustic signal causes a change in stress in the magnetic material and, in turn, a change in the material's magnetization. An electrical coil surrounds the magnetic material and converts the changing magnetization into an electrical signal. A plurality of transducers may be assembled into an array and towed behind a ship to detect underwater acoustic signals.

16 Claims, 10 Drawing Figures

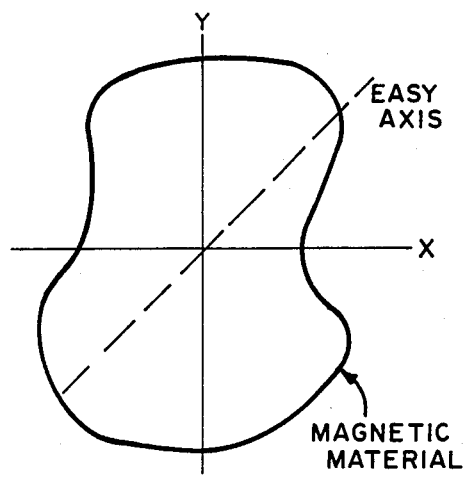
FIG. 1a NO BIAS, NO STRESS
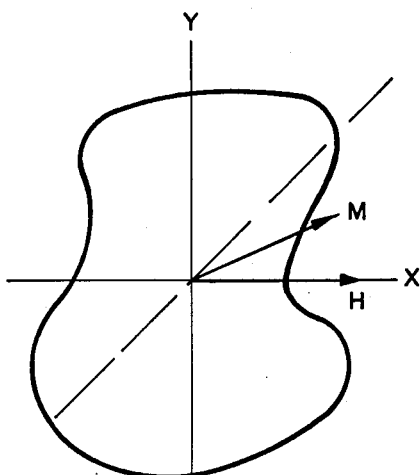
FIG. 1b MAGNETIC BIAS, NO STRESS
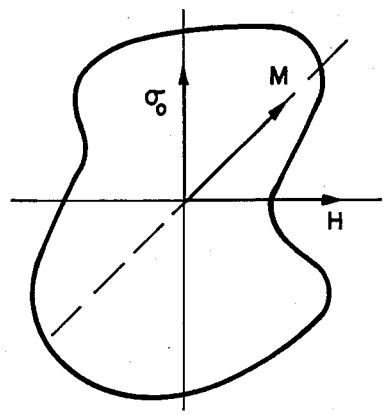
FIG. 1c BIAS AND PRE-STRESS
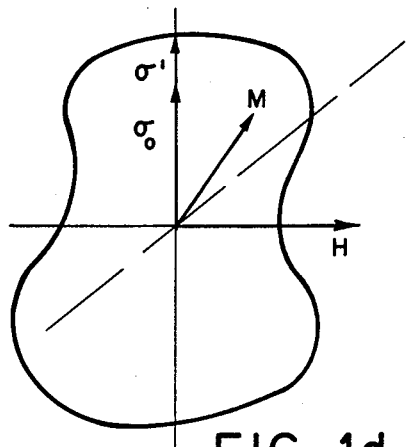
FIG. 1d EFFECT OF INCREASED STRESS
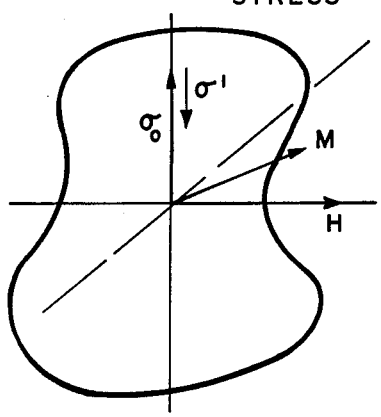
FIG. 1e EFFECT OF DECREASED STRESS

MAGNETOSTRICTIVE ACOUSTIC TRANSDUCER

BACKGROUND OF THE INVENTION

1. Field of the Invention

This invention relates to an apparatus for detecting acoustic signals; in particular, underwater acoustic signals.

2. Description of the Prior Art

Hydrophone receivers are used for detecting underwater acoustic signals. These signals may emanate from natural sources (marine life), from ships at sea (both surface and subsurface), and from the Earth, itself (seismic signals). Hydrophones are used for locating and identifying the sources of these emissions by sonar techniques, both in the passive and in the active mode. In the passive mode, the hydrophone senses signals generated by the object of interest, itself; in the active mode, the hydrophone senses echo signals resulting from reflections off the object of signals that are generated by the investigator. In some cases of active sonar investigations, the outgoing signal is generated by the hydrophone. In other cases, a separate device (either continuous or explosive) is utilized for generation.

The sensing element of a hydrophone is an acoustic transducer; i.e., a device for converting an acoustic signal to a signal in another form, such as an electrical signal. Among the acoustic transducer materials known in the art are piezoelectric and magnetostrictive materials.

Piezoelectric materials develop an electrical signal when stressed and are thus suitable for use as acoustic transducers. Piezoelectric materials that have been used for that purpose include ceramics such as lead zirconate titanate. A problem with piezoceramic acoustic transducers is that they tend to be brittle. Certain applications require hydrophones that are a meter or more in length and that must be able to withstand appreciable bending stress. To accomplish this with ceramics, it is necessary to combine many relatively short cylinders that are mechanically free to move independently (i.e., to flex like a spine made of rigid vertebrae) but that are electrically coupled so that their individual output voltages are summed. This permits the element to appear electrically as a long unit while providing the required mechanical flexibility. Since each element must have its own charge amplifier and the output characteristics of each element and amplifier must be closely matched for good performance, these ceramic hydrophones tend to be rather complex.

Magnetostrictive materials that have been used in acoustic transducers include nickel, nickel alloys, and rare-earth iron alloys. Nickel and its alloys have several limitations, including relatively low magneto-mechanical coupling factor, k. The efficiency of a transducer is directly proportional to $k^2$. Some rare-earth iron alloys have high magnetostriction; however, these alloys typically have high magnetic anisotropy, which tends to make them undesirably magnetically hard, and have low mechanical ductility, which places severe restrictions on their use.

Magnetostriction of ferromagnetic metallic glasses was studied by O'Handley (Solid State Commun. 21, 1119 (1977)) He found that the magnetostriction of iron-cobalt glasses shows a maximum at low cobalt concentration while that of the iron-nickel glasses drops monotonically from its value at $Fe_{80}B_{20}$. Arai and Tsuya (J. Appl. Phys. 49, 1718 (1978)) measured the magnetostriction and magneto-mechanical coupling coefficient, k, of iron-rich amorphous ribbon. They found values of k as large as 0.75 for amorphous $Fe_{78}Si_{10}B_{12}$ ribbon after magnetic annealing.

SUMMARY OF THE INVENTION

In accordance with the present invention, an acoustic transducer is provided. The transducer comprises support means, at least one layer of magnetostrictive ferromagnetic material disposed on at least a portion of the surface of the support means, and means associated with the ferromagnetic material for detecting a change in magnetization therein. In operation, the transducer is used to detect acoustic signals, particularly underwater signals.

The transducers of the present invention provide several advantages over prior art transducers. Transducer elements are of simple construction, are flexible, and may be fabricated to any desired length. Glassy metal alloys, which are preferred as magnetic materials, have higher magneto-mechanical coupling factor than do prior art materials, permitting higher efficiency.

BRIEF DESCRIPTION OF THE DRAWINGS

FIGS. 1a to e illustrate the principle of operation of a magnetostrictive transducer.

DETAILED DESCRIPTION OF THE INVENTION

Figure 2:
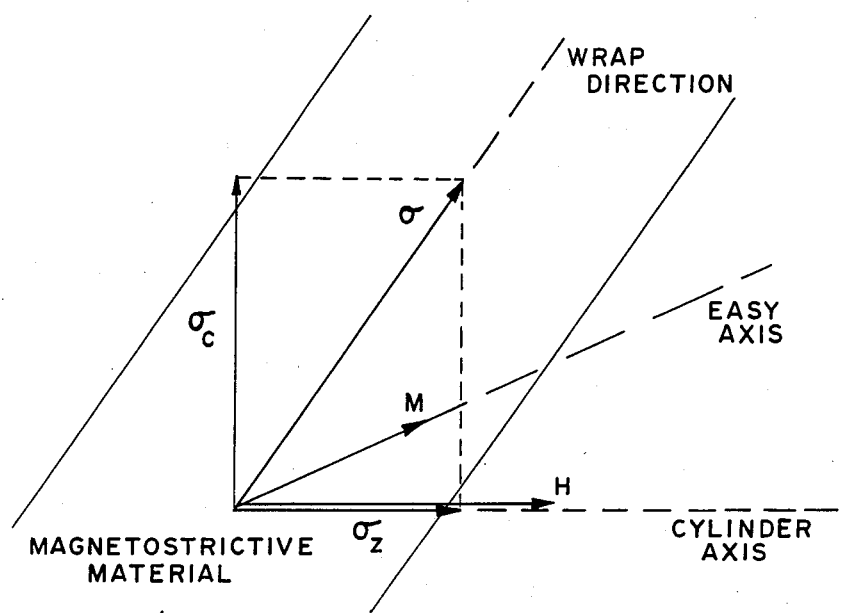
FIG. 2 illustrates the orientations of stresses and magnetic fields in a magnetostrictive transducer.

The present invention provides an acoustic transducer that is particularly well suited for use as a hydrophone to aid in locating and identifying underwater sound sources. A design is proposed that uses the magneto-mechanical coupling of magnetostrictive ribbon or wire to convert an acoustic pressure wave into an electrical voltage. The ribbon or wire is helically wound, under tension, around a resilient elongated rod. An electrical coil is then wound coaxially around the magnetic material and the rod.

An incoming acoustic pressure wave compresses the rod, thereby relaxing the tension on the ribbon or wire. With this tension reduction, the magnetic domains—originally aligned close to the material's easy axis—swing toward the cylinder axis. This change in magnetization induces an output voltage in the surrounding electrical coil.

In a preferred embodiment, which permits substantial reduction of background noise, a plurality of elements are connected end-to-end. This array of elements may be towed behind a ship and is called a "towed-array hydrophone." Typically, the elements are each about 1 m–2 m long and are about 2 m–6 m apart. Since the elements need to be somewhat flexible (so that they will not break in towing or in reeling operations), conventional ceramic transducers cannot be used in a simple manner for this application.

The wavelength, λ, of a sound wave is the velocity, v, divided by the frequency, f. Since the velocity of sound in water is about 1500 m/s, and since the elements of a linear array are ideally spaced approximately a half wavelength apart, the elements should be about 4 m apart to detect a 200 Hz signal, for example. As 200 such elements are required to provide adequate resolution, the total length of the array is about 800 m. This length exceeds that of a search ship; thus, the array must be towed behind the ship. This configuration also isolates the array from the noise generated by the ship, to some extent, since the array can be made insensitive to sound travelling parallel to the array length.

Unfortunately, the motion of the array through the water generates noise on the outer surface of the array, which is called "flow noise." Some of the flow noise can be removed by temporal filtering (i.e., making the receiving equipment sensitive only to signals whose frequencies lie within a very narrow frequency band that includes the frequencies of the signals of interest). However, the flow noise often has a large component within that frequency band, so some other method of noise removal is required.

The present invention reduces flow noise by a spatial filtering method. This method is made possible by the great difference between the propagation speed of the signal (~1500 m/s) and that of the flow noise (~10 m/s). Because of this difference, the wavelengths of the two emissions are very different even when the two frequencies are identical. Spatial filtering is accomplished by using a sensor whose length is much greater than the wavelength of the noise. This is possible in the low frequency (200 Hz) sonar case, where the element spacing is of the order of 4 m, which is very much greater than the noise wave length (0.05 m). If elements of length approximately 2 m are used, the device senses the sum of approximately 40 noise waves, which is nearly zero, since that is the average value of the noise.

Thus, what is sought is a sensitive hydrophone device with moderately flexible elements that are a few meters long. The present invention accomplishes this by using a single ribbon or wire of magnetostrictive material in each meters-long element to provide an intrinsically flexible device.

The operation of the present invention depends upon the stress sensitivity of the magnetostrictive material. In the unstressed state, the magnetic domains in such materials are oriented parallel to some preferred direction called the "easy axis." If the material is stressed in a direction other than the easy axis direction, the domains effectively reorient themselves, (either by domain rotation or by preferential domain growth) so that they lie in a direction more parallel to the stress (for positive magnetostriction material) or more perpendicular to the stress (for negative magnetostriction material). Since the orientation of these domains can be affected, as well, by externally applied magnetic fields, one can arrange the interplay between a stress, a magnetic field, and an internal easy axis so that the magnetic properties of the material act like an elastic "spring-mass" system.

In FIG. 1, a specimen with positive magnetostriction is shown with its easy axis at 45° to the directions x and y. If a constant external magnetic field, H, hereafter referred to as a bias field, is impressed in the x-direction, the domains shift toward the x-axis and the material has a net magnetization M in the direction shown in FIG. 1b. Since the specimen is positively magnetostrictive, a tensile stress in the y-direction causes the domains to orient toward the y-axis. For a given material and bias field, there is a stress $\sigma_0$ that causes the net magnetization to lie parallel to the easy axis (FIG. 1c). This value of stress is referred to as the "pre-stress." The magnetization is in a stable equilibrium under the conditions of FIG. 1c and can be made to swing symmetrically either toward or away from the y-axis under the influence of additional positive or negative y-direction stresses, respectively (FIGS. 1d and 1e).

A similar situation exists for materials with negative magnetostriction, except that the stress must be applied parallel to the bias field direction. In the specification that follows, magnetic materials are assumed to have positive magnetostriction unless otherwise specified. However, in each case, materials having negative magnetostriction may be substituted if appropriate adjustments are made in the directions of stress and bias field.

The magnetic bias field requirement is reduced or even eliminated in cases where the material has a significant magnetic remanance and an easy axis at less than 45° to the x-axis. Such remanence means that the material has a net magnetization in the absence of an external bias field and the narrative given above remains valid. The effect of stress is the same for magnetostrictive materials in the remanent case as in the non-remanent case.

The stress-produced reorientation of the material's magnetization can be sensed simply by placing the specimen within a cylindrical electrical coil (solenoid). A reorientation of the magnetization within the space enclosed by the coil induces a voltage in the coil by virtue of Faraday's Law, for read-out on a voltmeter.

The practical application of this effect requires a mechanical and electrical configuration that transduces incident acoustic pressures into electrical signals. The elements of such an acoustic transducer include a resilient support, preferably an elongated rod; a layer of magnetostrictive material adhered to at least part of the outer surface of the support; and a sensing coil formed from insulated high-conductivity wire (e.g., copper).

The elongated support must be able to resist the compression of undersea pressures at the operating depth. It must also be flexible enough for reeling, resilient enough radially for sufficient response to incoming acoustic waves, and stiff enough axially to resist the longitudinal stresses caused by towing.

These requirements can be met by appropriately selecting the material and dimensions of the support and by suitable reinforcement, if necessary. In particular, the desired mechanical properties, such as elastic moduli, are within the range found in conventional elastomeric materials. The support may be solid or hollow. If hollow, the support is closed at both ends and the ratio of inner to outer radius and the material inside the tube (e.g., gas, liquid, foam, etc.) are selected to suit the application. For some applications, it is desirable that the fluid inside the tube be at an elevated pressure. High-strength, non-magnetic filaments (such as aramid or carbon fiber) may be used to reinforce the tube and to maintain constant tube length under longitudinal towing stresses. Spiral- or bias-wrapped reinforcement may be used to resist twisting of the tube.

A ribbon or wire of magnetostrictive material is wrapped in a helix around the support and is held fixed to the support's outer periphery. Preferably, each turn overlaps to some extent the previous turn. If desired, an adhesive may be used to adhere the wrap to the support.

In a particularly simple structure, the adhesive and support are of the same material.

A pre-stress is applied to the ribbon or wire during wrapping, and the helical wrap angle is chosen so that the material's magnetic easy axis lies between the axial direction of the support and the wrap direction (FIG. 2). Furthermore, by balancing the pre-stress in the wrap against a magnetic bias (provided either by an external field or by remanence in the material) the net magnetization of the material is not parallel to the stress direction. It will be seen that FIG. 2 displays a magnetic system that is identical to that of FIG. 1c except that the pre-stress, $\sigma$, is composed of two components: $\sigma_z$ in the axial direction and $\sigma_c$ in the circumferential direction. The axial stress reduces the need for magnetic bias. In operation, the circumferential component varies with acoustic pressure. A compressive acoustic wave causes the support diameter to diminish, reducing circumferential stress in the magnetic wrap. Conversely, an acoustic rarefaction increases both diameter and stress. The magnetization of the material thus orients itself, in essence, in an elastic equilibrium system where circumferential stresses resulting from external acoustic waves are counteracted by a combination of magnetic anisotropy (easy axis), magnetic bias (due either to an external field or to remanence in the material), and axial pre-stress.

A change in the magnetization generates a signal in a detection system; for example, a voltage in a coil surrounding the magnetic layer.

The most important characteristic of the magnetostrictive transducing material is its magneto-mechanical coupling coefficient, k, which measures the efficiency with which the material can convert mechanical stresses into changes in magnetization (and vice versa). The efficiency of a transducer is proportional to $k^2$. Materials having coefficients greater than 0.35 are preferred.

Among candidate materials, amorphous magnetic alloys have k up to about 0.95 (with positive magnetostriction) and certain crystalline nickel alloys have somewhat lower coefficients (with negative magnetostriction). Metal alloys that are at least 50% amorphous are preferred, because of their high coupling coefficient and mechanical strength and because of the ease with which the natural ribbon geometry of such alloys can be applied to the construction.

Among amorphous alloys, iron-rich alloys are preferred because they have high magnetostriction and relatively low magnetic anisotropy. Suitable alloys comprise about 60-90 atom percent iron, from 0 to about 33 percent of which may be replaced by at least one element selected from the group consisting of nickel and cobalt; from 0 to about 25 atom percent boron; from 0 to about 20 atom percent of at least one element selected from the group consisting of phosphorus, carbon and silicon; and from 0 to about 10 atom percent of at least one element selected from the group consisting of aluminum, molybdenum, vanadium, and chromium.

At low cobalt concentration, if cobalt is substituted for iron, magnetostriction increases, which is desirable, but magnetic anisotropy also increases, which is undesirable. When nickel is substituted for iron, both magnetostriction and anisotropy decrease. Alloys containing more than about 22% boron have undesirably high anisotropy, while silicon up to about 12% provides low anisotropy. Addition of phosphorus or carbon to alloys generally reduces their stability.

Preferred alloys have nominal compositions in the ranges indicated below, where subscripts denote atom percent:

$Fe_{60-85}Ni_{0-20}B_{12-22}Si_{0-12}$ $Fe_{65-85}Co_{0-20}B_{10-22}Si_{0-12}$ $Fe_{70-85}B_{10-22}Si_{5-12}$

Specific examples include $Fe_{67}Co_{18}B_{14}Si_1$ and $Fe_{82}B_{12}Si_6$.

The magneto-mechanical coupling coefficient of amorphous alloys may be increased by annealing; however, ductility is reduced. Thus, the annealing temperature involves a compromise, and a temperature about 70° C. below the crystallization temperature is preferred. Annealing in an ac magnetic field minimizes resulting magnetic anisotropy. Alternatively, a ribbon may be annealed with the magnetic field in the plane of the ribbon, tranverse to its length. The resulting easy axis will then be in the same direction as the applied field Although the use of amorphous magnetic alloys has been discussed with reference to a particular type of transducer construction, the alloys described may be used with any acoustic transducer of the type in which a magnetostrictive material is adapted to change its magnetization in response to an incident acoustic signal and the change in magnetization is detected by a sensing means.

The present transducer design can be constructed from a variety of magnetostrictive materials in a variety of shapes (round or oval wire or rectangular ribbon) and sizes (diameters or widths and thicknesses). In a preferred embodiment, the support is helically wound with amorphous alloy ribbon having a width between about 1 mm and 100 mm. The helical wrap angle, the degree of pre-stress, and the number of layers of magnetic material can be selected to meet the specific mechanical and electrical characteristics for each application. For example, the number and thickness of the magnetostrictive metal layers involves a compromise between sensitivity (increased with thickness) and mechanical flexibility (decreased with thickness). In general, if the support diameter is too small, then in winding the magnetostrictive material around the support, a large pre-stress is developed and the magnetization is parallel to the stress. In that case, the transducer cannot operate properly. Thus, support diameters greater than about 2 mm are preferred.

A thin layer of a flexible material with low acoustic absorption (such as a conventional plastic film) may surround the magnetostrictive layer. This optional layer may be incorporated, if necessary, to provide electrical and mechanical separation between the magnetic material and the surrounding coil. That is, the layer protects against short circuits and flexure-induced abrasion between the coil and the magnetic material. The interlayer may be a seamless tube or a wrapped sheet and may be shrunk around the magnetic material, if desired, if the material and treatment are chosen appropriately.

The sensing coil is preferably formed from insulated (e.g., formvar), high-conductivity wire (e.g., copper). Ideally, the coil is wound so as to minimize both its acoustic absorption and reduction of assembly flexibility. In practice, the values of wire diameter and turns per unit length that provide adequate sensitivity and flexibility involve a compromise. About 200 turns/cm of thin copper wire is typical.

If a magnetic bias is required, a current may be passed through either the sense coil or through a second coil wound coaxially with the sense coil.

The entire transducer assembly is preferably encased in a flexible coating that excludes water. This coating may be of the type used with conventional hydrophones that are operated in similar sea environments, temperatures, and depths. These coatings, well known in the art, may comprise an elastomeric material such as neoprene.

Figure 3:
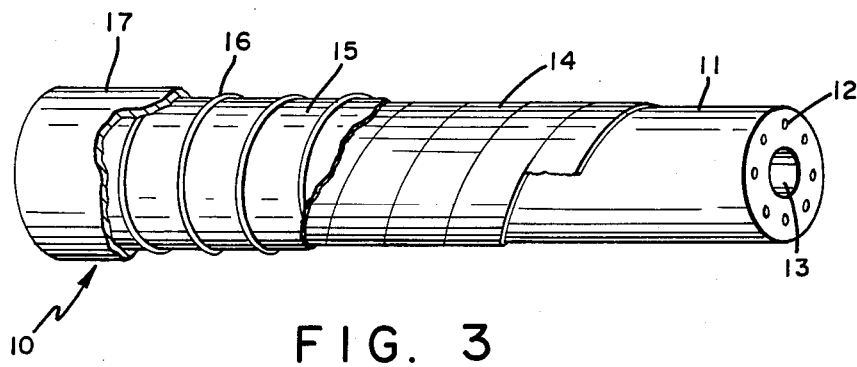
FIG. 3 is a cutaway view of an embodiment of the present invention.

FIG. 3 depicts an embodiment of the present invention in cutaway. The transducer 10 consists of elongated resilient tube 11 having optional reinforcing strands 12 and hollow center 13. The tube is wound with magnetostrictive ribbon 14. Optional interlayer 15, sense coil 16, and protective outer coating 17 provide successive coaxial layers.

The towed array hydrophone, for undersea acoustic detection, is composed of a linear string of the active elements described above with an appropriate inter-element spacing. In a representative array for detecting signals of wavelength $\lambda$, elements of length $\lambda/4$ would have centers separated by a length $\lambda/2$. The individual elements may be joined using conventional undersea hardware, including connectors that provide water-tight mechanical and electrical continuity throughout the towed array.

Figure 4:
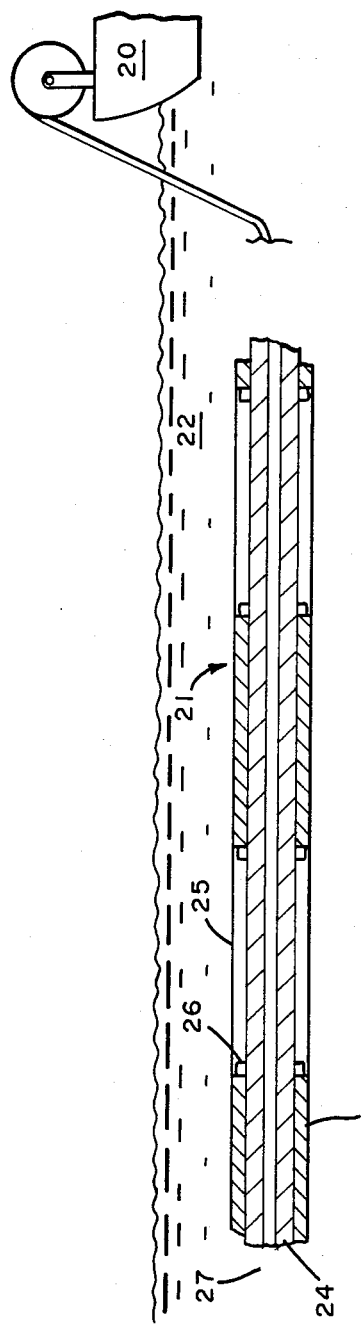
FIG. 4 is a schematic sectional view of an array of transducers being towed behind a towing vessel.

FIG. 4 shows a towing vessel 20 towing a hydrophone array 21 through water 22. In order to reduce the generation of eddies in the water flowing longitudinally during towing, the hydrophone assembly should be as smooth in contour (i.e., streamlined) as possible. Thus, in the construction shown in FIG. 4, several active elements 23 are wrapped on one long support 24. The active elements 23 are separated by non-wrapped sections 25 of the same length.

It is convenient to locate in non-wrapped sections 25, signal amplifiers and multiplexing units 26 that combine the signal for each active element with those of other elements that share a common signal output cable. The output cable and the input power cables for bias current (if necessary) and electronics power are composed of twisted pairs threaded through a central cavity 27 in support 24. (Note that even in the "solid rod" design, a closely fitting hole or other means can be provided for the cables without materially affecting the mechanical properties of the device.) On board the towing vessel 20 are located delay-and-sum, temporal filtering, and amplification circuits (not shown) for analyzing the acoustic signal received by the hydrophone. Also on board are power supplies for bias field current, if needed.

The construction shown in FIG. 4 reduces the number of end connections required, thus reducing the cost of the array. However, a certain number of field-demountable end connectors are needed in the total array to permit replacement and repair of defective elements. Connectors must withstand the positive external pressure of the sea at operating depth and must also withstand (in the internally pressurized hollow-element embodiment) positive internal pressures when the device is not at operational depth. The full assembly can be constructed to possess neutral buoyancy at the operating depth by suitable material choice and system design.

Since the active elements, as described above, consist in part of electrical coils surrounding magnetically soft material, the device would be sensitive to changes in magnetic flux due to external electromagnetic radiation. There are two alternative embodiments of this invention that would be useful if there is present a significant amount of such electromagnetic radiation in the frequency band of interest.

Figure 5:
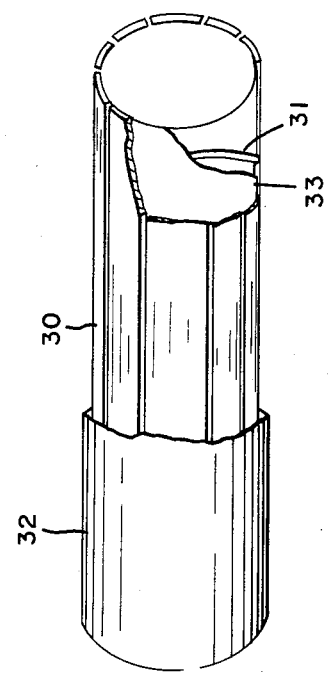
FIG. 5 is a cutaway view of an embodiment of the present invention that includes magnetic shielding.

FIG. 5 shows an embodiment in which a flexible magnetic shield 30 is located outside the sensing coil 31 but within the water-tight coating 32. This shield may be constructed, for example, from non-magnetostrictive amorphous alloy ribbon with suitable soft magnetic properties, applied longitudinally. Such ribbon would not be stress-sensitive but would be effective in diverting field lines to the outside of the sensing coil. An interlayer 33 may be used between the shield and the electrical coil. The terminations at the extreme ends of the hydrophone array would incorporate a sheet of magnetic shielding material, as well.

Figure 6:
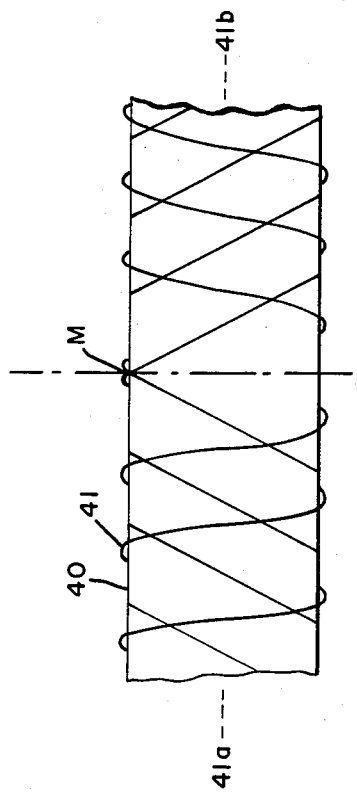
FIG. 6 is a schematic of an alternative embodiment to that shown in FIG. 5.

The added weight and possible flexibility reduction inherent in the alternative above can be avoided by constructing each element in an opposed-pair configuration as shown in FIG. 6. In such an arrangement, magnetostrictive ribbon 40 and sense coil 41 are wound oppositely in the two half-elements and their magnetic characteristics matched so that they respond equally and oppositely to an externally generated change in magnetic flux. This can be achieved in a straightforward manner by exercising suitable care during fabrication to maintain stress and coil turns equal in the two oppositely-wound halves. If the two sense coils are connected to the output electronics as a single center-tapped coil (that is, with both half-coils joined at the middle M and with both end leads, 41a and 41b, joined), the effect of acoustic signals on the two half-elements will reinforce each other, while the effect of external electromagnetic signals cancel.

Neither of these alternative configurations is required to counteract effects due to the Earth's magnetic field. This is because the device is sensitive first only to *changes* in incident magnetic field and then only to changes with a significant *frequency component* at the frequency of interest. Local variations in the Earth's field itself or changes in the flux received from the Earth's field due to motions of the long elements would be at very much lower frequencies.

The following example is presented in order to provide a more complete understanding of the invention. The specific techniques, conditions, materials, and reported data set forth to illustrate the principles and practice of the invention are exemplary and should not be construed as limiting the scope of the invention.

EXAMPLE

A 0.25 m length of rubber hose, 25 mm OD, 6 mm wall, was sealed at both ends with epoxy and rubber stoppers. Through one end a hole was cut and a hose fitting installed to allow pressurization and/or fluid to be inserted.

The outside surface of the hose was spray coated with a polyurethane adhesive. With constant tension, METGLAS 2605 Co alloy ribbon, 12 mm wide × 0.03 mm thick, coated with polyurethane adhesive on its inner surface, was wrapped helically around the outside of the hose. The wrapped hose was then dip coated in a polyurethane insulating and waterproofing material. A coil of 2372 turns of #32 insulated copper wire was wound over the METGLAS portion of the device. The entire assembly was again dip coated in the insulating and waterproofing material. The coil leads were connected to a voltmeter.

In test operation, the assembly was placed in a sound pressure chamber whose resonant frequency was much higher than the frequency of the signal to be detected. External pressure signals applied to the assembly generated a signal that was indicated on the voltmeter.

We claim:

1. An acoustic transducer comprising support means, having disposed on at least a portion of their surface at least one layer of helically-wound ribbon of magnetostrictive ferromagnetic alloy that is at least 50% amorphous,
   a solenoidal wire coil associated with the ferromagnetic alloy for detecting a change in magnetization therein, and
   a magnetic shield surrounding the coil and adapted to shield the coil from external magnetic fields.

2. The transducer of claim 1 wherein the support means comprises an elongated resilient rod.

3. The transducer of claim 2 wherein the support means has an axial cavity, closed at both ends and filled with a fluid.

4. The transducer of claim 3 wherein the fluid is a liquid.

5. The transducer of claim 3 wherein the fluid is at an elevated pressure.

6. The transducer of claim 1 wherein the ferro-magnetic alloy comprises paired, oppositely-magnetized half-elements and the coil comprises paired half-coils joined at about the middle point between the ends of the transducer; whereby acoustic signals incident on the half-elements provide electrical signals that are added and any effects of external magnetic signals incident on the half-elements are subtracted.

7. The transducer of claim 1 further comprising a thin interlayer surrounding the layer of ferro-magnetic alloy and adapted to provide electrical and mechanical separation between that layer and the coil.

8. The transducer of claim 1 further comprising a coating enclosing the transducer and adapted to exclude water therefrom.

9. The transducer of claim 1 further comprising means for applying a magnetic bias to the transducer.

10. An array comprising a plurality of the transducers of claim 2, joined end-to-end.

11. The transducer of claim 1 wherein the alloy comprises about 60–90 atom percent iron, from 0 to about 33% of which may be replaced by an element selected from the group consisting of nickel and cobalt; from 0 to about 25 atom percent boron; from 0 to about 20 atom percent of at least one element selected from the group consisting of phosphorus, carbon and silicon; and from 0 to about 10 atom percent of at least one element selected from the group consisting of aluminum, molybdenum, vanadium, and chromium.

12. The transducer of claim 11 wherein the alloy comprises about 60 to 85 atom percent iron, from 0 to about 20 atom percent nickel, about 12 to 22 atom percent boron, and from 0 to about 12 atom percent silicon.

13. The transducer of claim 11 wherein the alloy comprises about 65–85 atom percent iron, from 0 to about 20 atom percent cobalt, about 10 to 22 atom percent boron, and from 0 to about 12 atom percent silicon.

14. The transducer of claim 11 wherein the alloy comprises about 70–85 atom percent iron, about 10 to 22 atom percent boron, and about 5–12 atom percent silicon.

15. The transducer of claim 13 wherein the alloy composition is nominally $Fe_{67}Co_{18}B_{14}Si_1$.

16. The transducer of claim 14 wherein the alloy composition is nominally $Fe_{82}B_{12}Si_6$.

* * * * *